(12) United States Patent
Rankin, V

(10) Patent No.: US 10,165,900 B1
(45) Date of Patent: Jan. 1, 2019

(54) MULTI-PURPOSE KITCHEN UTENSIL

(71) Applicant: Alexander Rankin, V, Bedminster, PA (US)

(72) Inventor: Alexander Rankin, V, Bedminster, PA (US)

( * ) Notice: Subject to any disclaimer, the term of this patent is extended or adjusted under 35 U.S.C. 154(b) by 0 days.

(21) Appl. No.: 15/994,511

(22) Filed: May 31, 2018

Related U.S. Application Data

(60) Provisional application No. 62/518,208, filed on Jun. 12, 2017.

(51) Int. Cl.
*A47J 43/28* (2006.01)
*A47G 21/04* (2006.01)

(52) U.S. Cl.
CPC .......... *A47J 43/288* (2013.01); *A47G 21/045* (2013.01)

(58) Field of Classification Search
CPC ........ A47J 43/28; A47J 43/288; A47G 21/045
USPC .................. 294/7; D7/688; 15/236.05; 7/110
See application file for complete search history.

(56) References Cited

U.S. PATENT DOCUMENTS

| | | | | |
|---|---|---|---|---|
| 1,612,367 A * | 12/1926 | Fulton | ................... | A47J 43/283 249/205 |
| 1,948,592 A * | 2/1934 | Nelson | ................ | A47G 21/045 294/7 |
| 2,294,569 A * | 9/1942 | Petersen | ............... | A47G 21/045 249/77 |
| 2,354,822 A * | 8/1944 | Meyran | .................... | A21B 3/13 249/77 |
| 2,667,829 A * | 2/1954 | McNutt | .................. | A21B 3/135 220/694 |
| 3,877,143 A * | 4/1975 | Montesi | ............... | A47G 21/045 30/114 |
| 4,877,609 A * | 10/1989 | Beck | ...................... | B65D 85/36 426/87 |
| 5,165,171 A * | 11/1992 | MacLean | ............. | A47G 21/045 294/7 |
| 7,044,518 B2 * | 5/2006 | Lang | .................... | A47G 19/265 294/7 |
| D632,530 S * | 2/2011 | Lion | .............................. | D7/642 |
| 2010/0263213 A1* | 10/2010 | Horwitz | .................. | A47J 43/28 30/142 |
| 2016/0353935 A1* | 12/2016 | Abrams | ................ | A47J 43/288 |

* cited by examiner

*Primary Examiner* — Dean J Kramer
(74) *Attorney, Agent, or Firm* — Howson & Howson LLP

(57) ABSTRACT

A one-piece, flat, stainless steel kitchen utensil formed with offset working portions for use in handling fried or baked food products and for scraping pots and baking pans. The utensil is composed of a unitary sheet of stainless steel divided into two working portions. One working portion is of rectangular shape and extends in a first direction. The other working portion is of trapezoidal shape and extends in a second direction opposite the first direction. The working portions are connected integrally by an intermediate portion extending transversely between the working portions to space them in separate planes.

15 Claims, 2 Drawing Sheets

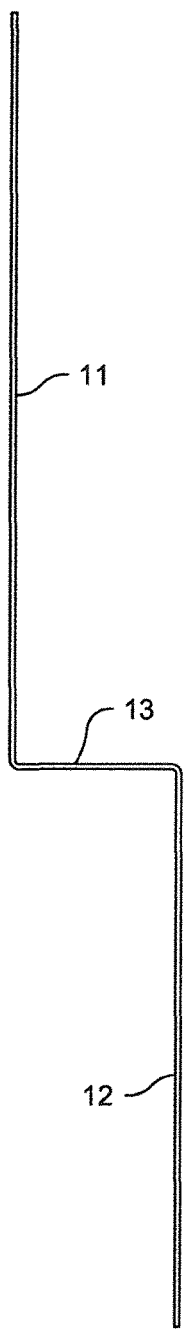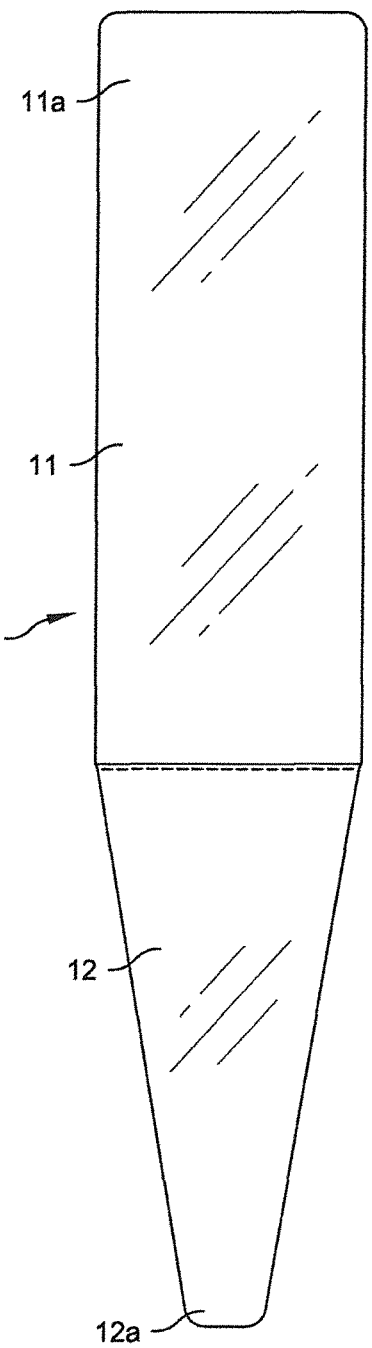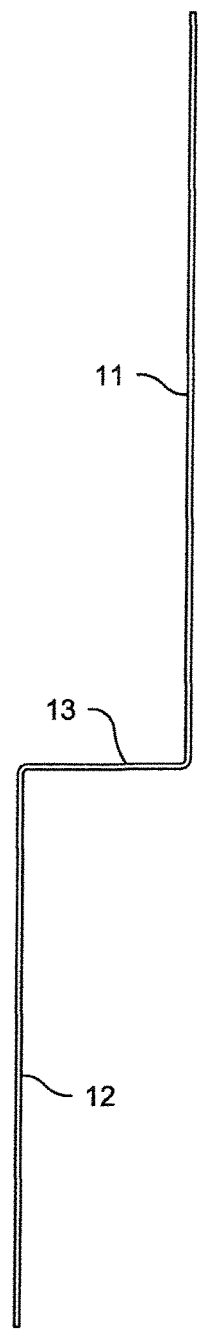
*Fig. 2*     *Fig. 1*     *Fig. 3*

MULTI-PURPOSE KITCHEN UTENSIL

CROSS-REFERENCE TO RELATED APPLICATION

This application claims the benefit of U.S. Provisional Patent Application No. 62/518,208, filed on Jun. 12, 2017, and incorporates by reference the entire disclosure thereof.

BACKGROUND OF THE INVENTION

There is a need for a kitchen utensil that can be used for multiple purposes while cooking, baking, or serving. Such a utensil needs to be easy to clean. It also needs to be robust and inexpensive to produce.

SUMMARY OF THE INVENTION

Briefly, the invention is a utensil for preparing and serving foodstuffs, and is composed of a unitary sheet of stainless steel divided into two working portions. One working portion is of rectangular shape and extends in a first direction. The other working portion is of trapezoidal shape and extends in a second direction opposite the first direction. The working portions are connected integrally by an intermediate portion extending transversely between the working portions to space them in separate planes. The overall length of a typical utensil in according to the invention is approximately ten (10) inches.

More specifically, the utensil consists essentially of a unitary, preferably imperforate, member of sheet stainless steel, formed with an elongated rectangular portion extending in a first direction, a tapered portion extending in a second direction opposite the first direction, and a web portion. The first and second portions are offset from each other and connected to each other by the web portion. The tapering of the tapered portion is such that a width dimension of the tapered portion becomes narrower, proceeding away from the web portion in the second direction.

Preferably, the length of the rectangular portion in the first direction is greater than the length of the tapered portion in the second direction.

In the preferred embodiment, each of the rectangular and tapered portions has opposite planar faces, and the faces of the rectangular portion are disposed in planes substantially parallel to planes in which the faces of the tapered portion are disposed. The web portion also has planar faces, and preferably extends substantially perpendicular to the planes in which the faces of the rectangular and tapered portions are disposed.

The widths of the planar faces of the rectangular and web portions, each measured in a direction perpendicular to the first direction and parallel to the planes of the planar faces of the rectangular portion, can be substantially equal, and are preferably approximately two inches.

The unitary member is composed of A.S.T.M. type 301 spring tempered stainless steel, and a uniform cold-rolled thickness in the range from approximately 0.18 to 0.25 inches, preferably about 0.22 inches.

The length of the rectangular portion, measured in the first direction, should be in the range from approximately 6 to 9 inches, preferably from 5 to 6 inches, while the length of the tapered portion, measured in the second direction, should be in the range from approximately 4 to 6 inches, preferably from 4.5 to 5.5 inches. The length of the web portion, measured in the direction of the offset between the first and second portions, that is, the offset between the first and second portions, is preferably approximately 1.5 inches.

BRIEF DESCRIPTION OF THE DRAWINGS

FIG. 1 is a top plan view of a utensil embodying the invention;

FIG. 2 is a left side elevational view thereof;

FIG. 3 is a right side elevational view thereof;

DESCRIPTION OF PREFERRED EMBODIMENT

Figure 4:
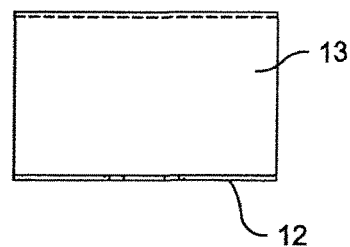
FIG. 4 is an end elevational view looking upward in FIG. 1.

The present invention provides a utensil 10 for use in preparing and serving foodstuffs. In its preferred form, it consists of a flat, imperforate, one-piece member of stainless steel formed with an elongate rectangular working portion 11 extending in a first direction and less-elongate tapered working portion 12 extending in a second direction opposite the first direction. The first and second working portions are offset from one another at a common location by an integral intermediate full-width web portion 13. The intermediate web portion is disposed closer to the narrow tapered end 12a than to the wide rectangular end 11a. This renders the overall planar extent of the rectangular working portion 11 slightly longer than the tapered working portion 12 for reasons to be discussed.

The entire utensil is made from A.S.T.M. Type 301 spring tempered stainless steel. The utensil has a uniform cold-rolled thickness in a range of between about 0.018 to about 0.025 inches. The preferred thickness is 0.022 inches. The rectangular portion has a uniform width of about two (2) inches and a length of 6 to 9 inches, measured from the connecting web. The length of the rectangular portion is preferably in the range from 5 to 6 inches. The tapered portion has a trapezoidal shape with an end edge portion remote from the connecting web. The end edge portion is formed with rounded corners and the width of the end edge portion, measured from the locations at which the rounded corners meet the tapered edges of the trapezoid is in a range of about 0.5 to about 0.75 inches. The length of the tapered portion, measured from the connecting web to the end edge portion, is in the range of about 4 to 6 inches, and preferably in the range from 4.5 to 5.5 inches.

The connecting web preferably extends substantially perpendicular to the planes in which the rectangular and tapered portions are disposed, and has a vertical extent, measured in a direction perpendicular to the faces of the rectangular and tapered portions, of about 1.5 inches to provide the desired offset of the working portions. The connecting web is of the same width as the rectangular portion so that it can serve as a radiant heat reflector when the utensil is gripped.

The utensil is flexible in a lengthwise direction, but stiff in the traverse widthwise direction. The tool is formed by bending a pre-cut blank sheet of stainless steel in opposite directions along upper and lower bends to form and define the connecting web, and to dispose the connecting web substantially perpendicular to the planes of the faces of the working portions.

The thus-formed utensil is de-burred in a conventional tumbler, and finish polished to a smooth surface using well-known finishing techniques.

The nature of the cold-rolled stainless steel is such that it possesses magnetic properties. This enables the utensil to be secured to a magnet and thus avoids the need for hooks or through holes.

Because the utensil in accordance with the invention consists essentially of a sheet of stainless steel, that is, it has no handle of wood, plastic or other material attached to the sheet of stainless steel, either the tapered portion or the rectangular portion can be used for cooking or serving foodstuffs while the other portion is utilized as a handle. The utensil exhibits a relatively low level of thermal conductivity and heat transfer, and thus either working portion can be gripped comfortably while the other working portion is in contact with a surface at a temperature up to about 212° F.

The rectangular portion is particularly suited for lifting fried eggs from a skillet, and the tapered portion is particularly suited for lifting segments of baked goods such a pies or cakes from a pan. The edges of the working surfaces, which are at least 0.018 inches thick and preferably 0.022 inches thick, afford sufficient thickness to be gripped comfortably by the palm and fingers of an adult hand. The hard utensil edges can also be used to scrape pots and baking pans. The polished surfaces clean-up readily.

Figure 5:
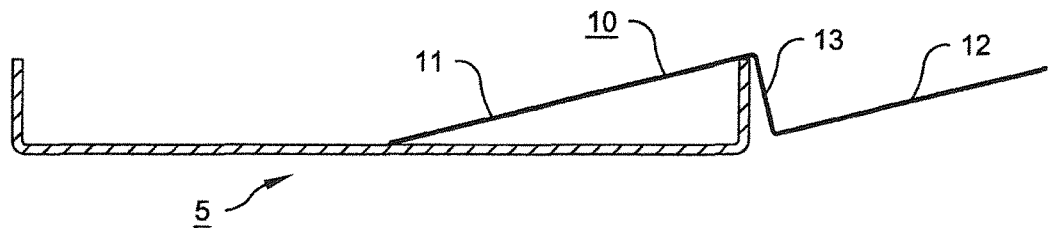
FIG. 5 is a schematic view illustrating the utensil disposed in an inverted stable static condition on a skillet rim.

The relative lengths of the working portions, and their configurations relative to the full-width intermediate web portion, place the center of gravity of the utensil at a location between the web and the end of the rectangular portion remote from the web. This enables the utensil to be inverted and temporarily hung on the edge of a skillet in a stable state as depicted in FIG. 5.

In such state, there is minimal conductive heat transfer contact between the skillet and the utensil. As a result, there is less of a chance for the utensil to heat-up, than if it were placed in a skillet with the forward working portion in contact with the bottom of the skillet for an extended period of time.

While a preferred embodiment of the invention has been described in detail, various modifications, alterations, and changes may be made without departing from the spirit and scope of the invention as described.

What is claimed is:

1. A utensil for preparing and serving foodstuffs, the utensil consisting entirely of a unitary member of sheet stainless steel, formed with a web portion having a substantially rectangular shape, said web portion having a first edge with two opposite ends, a second edge parallel to and spaced from said first edge and also with two opposite ends, and opposite side edges each extending from one of said opposite ends of said first edge to one of said opposite ends of said second edge, a rectangular portion extending in a first direction from said first edge of the web portion, said rectangular portion being elongated in said first direction and having substantially planar opposite faces, a tapered portion extending from said second edge of the web portion in a second direction opposite said first direction, said tapered portion being elongated in said second direction but having a length in said second direction less than the length of said rectangular portion in said first direction, said tapered portion having opposite faces in planes parallel to the planar opposite faces of said rectangular portion, said rectangular portion and said tapered portion being offset from each other in a direction perpendicular to said planar opposite faces of the elongated rectangular portion and connected to each other by said web portion, wherein:

said rectangular portion has two substantially parallel side edges extending in said first direction and meeting respective opposite ends of said first edge of the web portion, and an end edge remote from said web portion and extending from one of said substantially parallel side edges to the other in a direction substantially perpendicular to said side edges of the elongated rectangular portion;

said tapered portion has two opposite side edges extending respectively from said opposite ends of said second edge of the web portion, to an end edge remote from, and shorter than, said second edge of the web portion.

2. The utensil according to claim 1, in which the unitary member of sheet stainless steel is imperforate.

3. The utensil according to claim 1, in which the tapering of said tapered portion is such that a width dimension of said tapered portion becomes narrower, proceeding away from said web portion in said second direction.

4. The utensil according to claim 1, in which each of said rectangular, tapered, and web portions has opposite planar faces and in which the widths of the planar faces of the rectangular and web portions, each measured in a direction perpendicular to said first direction and parallel to the planes of the planar faces of said rectangular portion are substantially equal.

5. The utensil according to claim 1, in which said unitary member is composed of A.S.T.M. type 301 spring-tempered stainless steel.

6. The utensil according to claim 1, in which said unitary member has a uniform cold-rolled thickness in the range from approximately 0.018 to about 0.025 inches.

7. The utensil according to claim 1, in which said unitary member has a uniform cold-rolled thickness of approximately 0.022 inches.

8. The utensil according to claim 1, in which each of said rectangular, tapered, and web portions has opposite planar faces, and in which the widths of the planar faces of the rectangular and web portions, each measured in a direction perpendicular to said first direction and parallel to the planes of the planar faces of said rectangular portion, are approximately two inches.

9. The utensil according to claim 1, in which the length of said rectangular portion, measured in said first direction, is in the range from approximately 5 to 9 inches.

10. The utensil according to claim 1, in which the length of said rectangular portion, measured in said first direction, is in the range from approximately 5 to 6 inches.

11. The utensil according to claim 1, in which the length of said tapered portion, measured in said second direction, is in the range from approximately 4 to 6 inches.

12. The utensil according to claim 1, in which the length of said tapered portion, measured in said second direction, is in the range from approximately 4.5 to 5.5 inches.

13. The utensil according to claim 1, in which the length of said web portion, measured in the direction of the offset between said first and second portions is approximately 1.5 inches.

14. The utensil according to claim 1, in which:
said web portion has opposite planar faces;
the widths of the planar faces of the rectangular and web portions, each measured in a direction perpendicular to said first direction and parallel to the planes of the planar faces of said rectangular portion are approximately 2 inches;
said unitary member has a uniform cold-rolled thickness in the range from approximately 0.018 to about 0.025 inches;
the length of said rectangular portion, measured in said first direction, is in the range from approximately 5 to 6 inches;

the length of said tapered portion, measured in said second direction, is in the range from approximately 4 to 6 inches; and the length of said web portion, measured in the direction of the offset between said first and second portions is approximately 1.5 inches.

15. The utensil according to claim 1, in which the center of gravity of said utensil is located such that the greater portion of the total weight of the utensil is on the side of said first edge the web portion from which said rectangular portion extends.

\* \* \* \* \*